United States Patent [19]
Guerin

[11] Patent Number: 5,355,154
[45] Date of Patent: Oct. 11, 1994

[54] ELECTRONIC COLOR PRINTERS MULTIPLE-PASS IMAGE SELF-REGISTRATION

[75] Inventor: Jean-Michel Guerin, Glendale, Calif.

[73] Assignee: Xerox Corporation, Stamford, Conn.

[21] Appl. No.: 996,388

[22] Filed: Dec. 23, 1992

[51] Int. Cl.$^5$ .............................................. B41J 2/435
[52] U.S. Cl. ................................. 346/108; 346/160
[58] Field of Search ............... 346/1.1, 107 R, 76 L, 346/108, 160; 355/208, 317, 326, 327

[56] References Cited

U.S. PATENT DOCUMENTS

| | | |
|---|---|---|
| Re. 32,967 | 6/1989 | St. John et al. ..................... 242/57.1 |
| 2,802,666 | 8/1957 | Crosfield ............................... 271/2.6 |
| 3,701,464 | 10/1972 | Crum ...................................... 226/3 |
| 5,250,988 | 10/1993 | Matsuura et al. ..................... 355/208 |
| 5,291,223 | 3/1994 | Ogane et al. ........................ 346/108 |

*Primary Examiner*—Mark J. Reinhart
*Attorney, Agent, or Firm*—Robert Cunha

[57] ABSTRACT

In a write white color xerographic system which builds up layers of color toner on a web prior to transfer to paper, the method of generating a toner mark on the belt on the first pass by use of the scanning laser, and of detecting that mark on subsequent passes to ensure registration of the first and subsequent passes. The marks are made on the photoreceptor slightly before and after the image area to indicate the area and shape of the image area, and are used in conjunction with ordinary start and end of scan detectors which are used to determine scan speed.

8 Claims, 3 Drawing Sheets

ELECTRONIC COLOR PRINTERS MULTIPLE-PASS IMAGE SELF-REGISTRATION

BACKGROUND OF THE INVENTION

The process of marking a registration mark on a photoreceptor (PR) during the first pass of a xerographic color printer, and then using that mark on subsequent passes to enable proper registration of the other color toner layers.

It is common in a xerographic printer to use a flexible belt photoreceptor or a belt on which toner is deposited before transfer to paper to increase flexibility of configuration of charging modules, raster output scanner (ROS), developer station, etc. Also, the net length available is much greater compared to a circular drum. Therefore several stations in series along the belt where each station deliveres one color becomes possible. In a black and white system, this works well, but in a color printing system there is the added difficulty, because of this flexibility, of guaranteeing that all of the layers of toner, usually four, are perfectly registered with respect to one another in spite of the slight expansion, contraction, twisting and velocity gradients of the belt. Therefore, the exact position and area of the previous layers of toner must be known before the next layer of toner can be deposited. Various methods of determining this have been proposed.

U.S. Pat. No. Re. 32,967 and U.S. Pat. No. 3,701,464 use a series of rectangular perforations adjacent one or both edges of the web as tracking indicia. In the alternative, these marks may be preprinted on the web. These marks can then be read out using a light source and photosensors. In operation, the marks are sensed and the placement of the toner on the web is calculated. By definition, any discrepancy between the location of the registration marks and the actual location of the toner will go undetected since the toner itself is not used as the indicia. Also, their correction method is mechanical through the stepper motors action on the rollers.

In U.S. Pat. No. 2,802,666 four registration marks, one in each of four colors of ink, are placed on the paper web between pages printed in color. The marks are shaped and positioned so that if one pass is depositing ink that is slightly out of registration with the others, this displacement will be detected and corrected for subsequent pages.

All of the above systems rely on an iterative process whereby successive pages are monitored and web distortions are corrected for over a period of time, and over a number of prints. A problem arises in a typical color copier where once the first primary color toner layer is deposited, the second and subsequent passes for the next color primaries must result in their being placed exactly on top of the first pass color primary toner layer, wherever this first pass toner happens to be placed.

An additional problem in a laser printer is that the scan speed, as determined by the polygon speed of rotation, is also slightly variable. Typically, start of scan (SOS) and end of scan (EOS) detectors will be used. The scanning beam will illuminate these at the start and end of the scan, and the beam velocity can be calculated therefrom. However, these devices will not accurately determine where the toner is actually being deposited, and that must be known if the later passes are to deposit toner in registration with the first.

SUMMARY OF THE INVENTION

In this system the first pass not only lays down a layer of toner, but also deposits on the photoreceptor a start of scan (SOS') and end of scan (EOS') marks. These marks not only can be located close to the actual print area of the photoreceptor, but also show exactly where the toner is being placed, as opposed to providing a basis for calculating it, as in the prior art. In addition, the scanning beam which lays down the toner is the same beam which will read the position of the marks on later passes, so there is complete certainty as to the correlation of the position of the beam with respect to the position of the toner. Finally, since the scanning beam is used to write and read the marks, no separate light source is needed.

This invention can also be applied to drums for sensing and providing proper registration in the process direction. One example would be a very large drum which accomodates two, three, or four color stations around its circumference.

One final difficulty must be overcome. Typically, laser printers are "write black" which means that toner will adhere to the photoreceptor, and a black dot will appear on the printed output, at every point where the laser was turned on to discharge the photoreceptor. If a toner mark is layed down on the first pass, and the beam is used to scan the mark on the second and subsequent passes, the second and subsequent passes will continue to lay down more toner on and around the mark, making the original mark impossible to read. Part of the combination of this invention is to use this marking system in combination with "write white" xerography. Here, by controlling the relative voltages of the photoreceptor and toner, the system lays down toner on every point that was not exposed by the laser. This opens the possibility of laying down the mark on the first pass by not exposing the point, and then scanning the mark on subsequent passes without laying down any more toner.

Using toner marks has the added advantage over permanent marks on the belt in that manufacturing and maintenance costs are reduced. The initial placement and continued maintenance of accurately placed marks or holes in the belt would be an added cost. In contrast, a toner mark is automatically created on the first pass and cleaned off after the last pass, without requiring any additional hardware, manufacturing procedures or xerographic process steps.

An alternate embodiment is to use a combination of permanent and toner markings. This option is discused below.

DETAILED DESCRIPTION OF THE INVENTION

Figure 1:
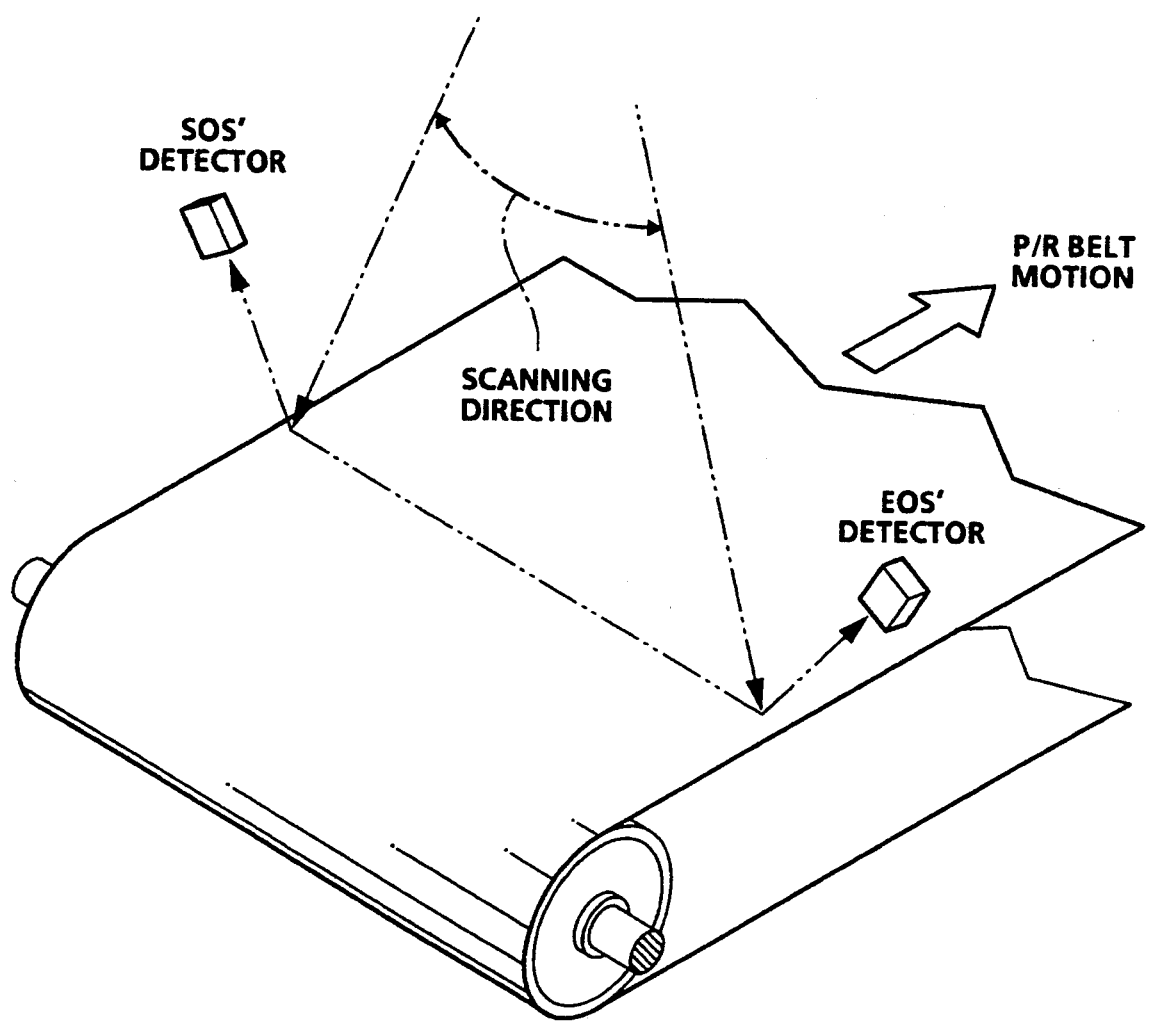
FIG. 1 shows the overall concept of the invention.

This invention is an arrangement of a laser raster output scanner (ROS) which will alleviate the registration problems associated with multiple-pass color printers. These problems results in different colors being shifted with respect to one another, and therefore, visible copy quality defects.

The main idea is to use the scanning laser beam reflection from the photoreceptor (PR) belt or drum at SOS and EOS as a probe to locate the P/R itself. Marks on the PR can provide drops in reflectivity which, when detected, can provide electronic signals. Preferred marks would be toner registration marks from the first pass.

In this fashion, the ROS would receive in addition to its own internal SOS and EOS, some new signals SOS' and EOS' which would locate the P/R position and stretching, and in the preferred configuration, the actual position and stretching of the first pass exposure. New synchronizing and variable clock oscillator (VCO) pixel clock adjustment would then be done which would then deposit the following passes much more exactly on top of the first pass. This also has the potential to lead to significant relief of printer mechanical tolerances.

Xerographic electronic color printers relying on serial exposure/development cycles, one pass for each color or black toner, encounter a registration problem due to the photoreceptor motion variability, vibration, thermal expansion etc. . . . After the first exposure/-development is done, the discharge pattern on the PR will follow the motion, vibration and thermal warps of the PR. The challenge is to register the following exposures to that first image which has now moved and has been slightly distorted with the PR.

In the prior art, most of the effort has been in tightening the motion tolerances of the photoreceptor and reducing the amount of jitter from the ROS.

This invention is based on the following characteristics of xerography; a) the scanning beam from the ROS reflects off of the PR plane at an angle at SOS and EOS positions, and therefore offers the possibility of those reflections being detected, and b) Toner on the PR will reduce the reflectivity of the PR quite significantly.

Therefore the basic idea is to use the ROS scanning spot as a probe to locate the lateral and longitudinal position of the photoreceptor and, thereby, to detect the width stretching or contracting of the photoreceptor, in addition to skew and actual relative positions between the toner images from previous passes and the upcoming exposure line about to occur.

The mechanism is detailed in the following sections. First is described the case where the different color toners are successively accumulated on the P/R after each pass, and are all transferred to the paper only at the end of the charge-expose-develop sequences. For reasons which will become obvious, this would be where the most benefit would result. Second is described the case where the toner is transferred to the paper after each pass, and therefore the PR is totally cleaned off of toner before the next pass. There will still be some benefit in this embodiment.

I. Toner Transfer to Paper at the End of the Multiple Pass

This case uses the ROS beam to expose registration marks on the PR, for example, between the edge erase and the SOS and EOS areas, on the first pass, along the full page on either side of the active write area (or "data to be printed area"). The first-pass toner is deposited as part of the image and also will be deposited to form the edge registration marks. On the following pass, as the beam scans, it will pass over the toner filled registration marks at the very beginning of the scan and at the very end of the scan. If fast optical detectors are properly located to intercept the SOS and EOS scanning beam reflections, the optical intensity of the reflections from the PR will undergo a large change when the center of the scanning spot passes over the toner-layered registration marks. Those signals can now become the synchronizing signals for the video stream for this second pass instead of the ROS's internal SOS and EOS signals. Those same first-pass toner-filled registration marks will also be used for the next passes. One could use different marks, a single bit line for a dip effect, or a thick line where the optical pulse edge fall time might be the preferred signal.

The advantage is that now the data stream for the passes following the first pass will be correlated to the image on the actual immediate location of the photoreceptor. Therefore the starting point of the video and the subsequent pixel placement can be accurately placed with respect to the first-pass pixels. Similarly to the current ROS video voltage controlled oscillator (VCO), where the output frequency of the video clock generator is a function of an input analog control voltage, the time between the "new SOS signal", SOS', and the "new EOS signal", EOS', can also be monitored to account for the possible thermal contraction or expansion of the width of the PR belt or drum. If it has stretched, the VCO will slow down correspondingly to stretch the pixel pulse widths. Because ROS electronics can perform this video clocking compensation function already to compensate for polygon speed variations, a comparison of the internal ROS SOS-to-EOS time interval to the SOS'-to-EOS' time interval can be accomplished to select the correct video clocking speed. The overall concept is illustrated in FIG. 1.

Figure 2:
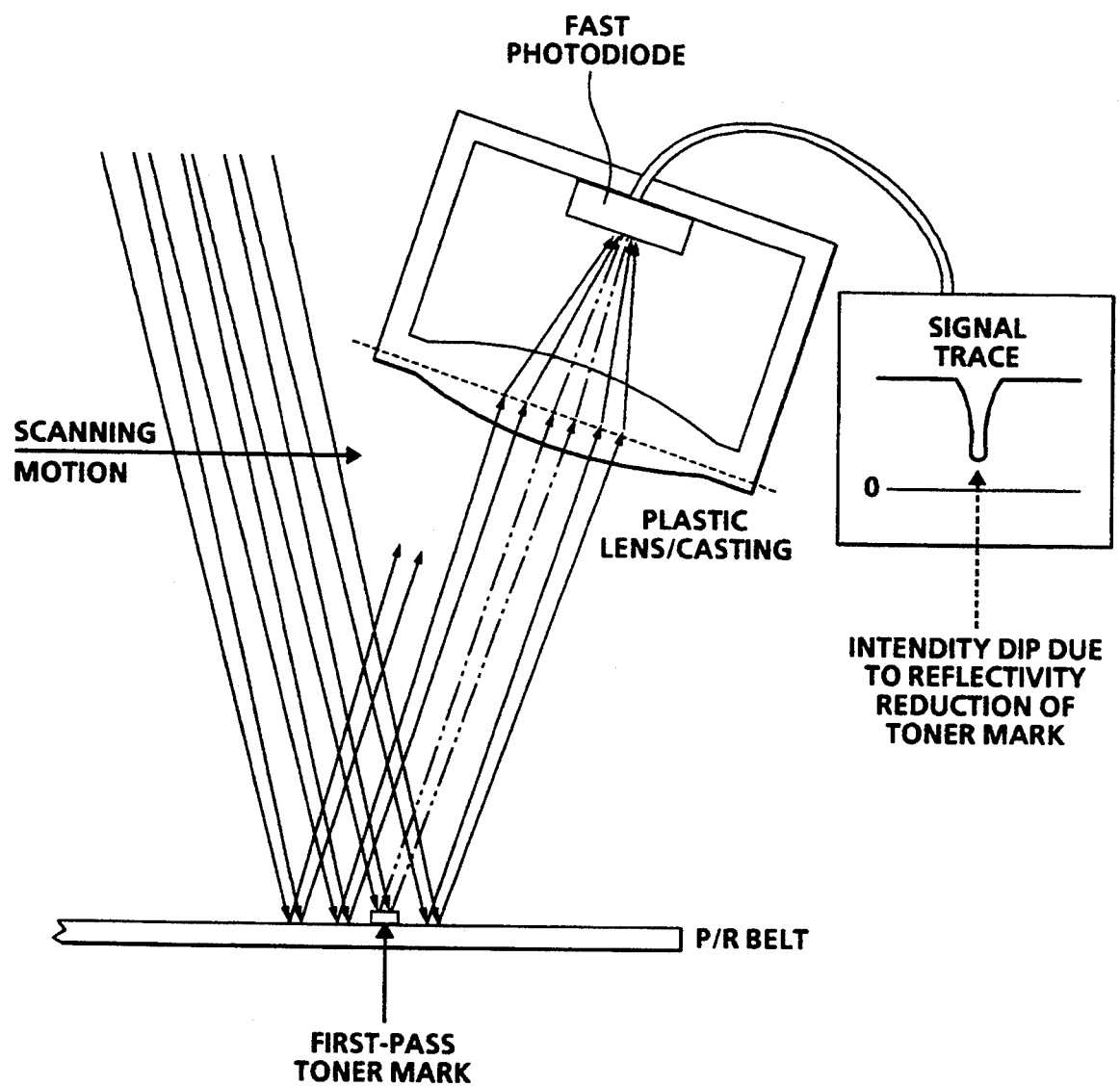
FIG. 2 shows four scanning positions with respect to the mark.

The beam path and signal mechanism is shown in FIG. 2 in more detail, depicting an EOS situation. As the beam illuminates the less reflective mark on the photoreceptor, the detector signal will undergo an amplitude dip. The negative or positive slopes can then be taken as the trigger slopes for synchronizing purposes and generation of SOS' and EOS'. The SOS, EOS, SOS', and EOS' signals are then received by the ROS video board electronics as shown on FIG. 3.

FIG. 2 shows four different scanning beam positions. Reflections from the PR are collected by a fast photodiode. When the beam iluminates the mark on the PR, much less light is reflected and results in the indicated signal. Note that this is not to scale and is a conceptual representation.

Figure 3:
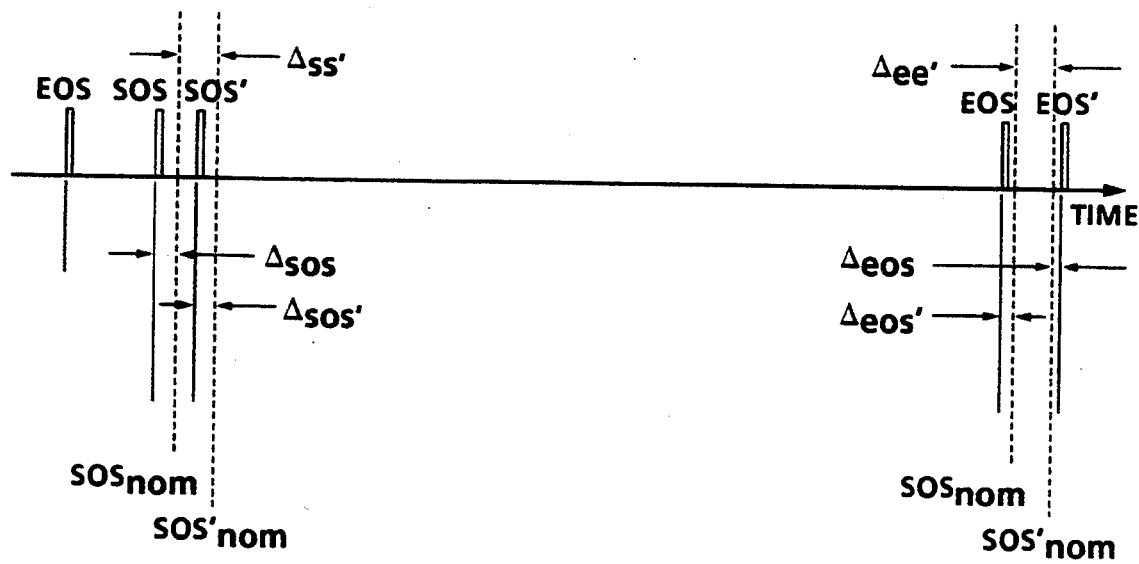
FIG. 3 shows a set of typical EOS, SOS, EOS' and SOS' signals.

FIG. 3 shows an example of SOS, SOS', EOS and EOS' signals being typically different from their nominal perfect timings. The nominal times of occurence of the SOS and EOS signals, and SOS' and EOS' signals if the PR was totally stable are shown in dotted lines and are labelled $SOS_{nom}$, $EOS_{nom}$, $SOS'_{nom}$, and $EOS'_{nom}$. This example shows a situation where SOS arrives $\Delta_{sos}$ prior to nominal, SOS' arrives $\Delta_{sos'}$ prior to nominal, EOS' arrives $\Delta_{eos'}$ prior to nominal, and that EOS arrives $\Delta_{eos}$ after nominal. From the ROS internal counting, this would mean that the scan time has stretched from nominal by $\Delta_{sos}+\Delta_{eos}$, indicating a slow-down of the polygon rotation. This is usually quite tight, as polygon rotation fluctuations occur on a time scale much longer than a single scan. The fact that SOS' arrives $\Delta_{sos'}$ prior to nominal only indicates that the PR has shifted towards SOS with respect to the first pass by a distance of $v_{scan} \times \Delta_{sos'}$. Based on the last SOS-to-EOS and SOS'-to-EOS' times, the VCO for the clock speed would be set, and the video would then start based on the SOS' signal, as it indicates the actual PR location. Note that the last few scan's SOS'-to-EOS' time would warn of any stretching or shrinking of the first pass image with respect to nominal. From one scan line to the next, PR motion and warping can be expected to be negligible, therefore the last few scans information with respect to warp is valid information. There would be a corresponding adjustment of the VCO. In the particular situation depicted in FIG. 3, one can see that $\Delta_{sos'} > \Delta_{eos'}$, indicating a stretch of the PR. Therefore the clock speed should be slowed proportionally.

Figure 4:
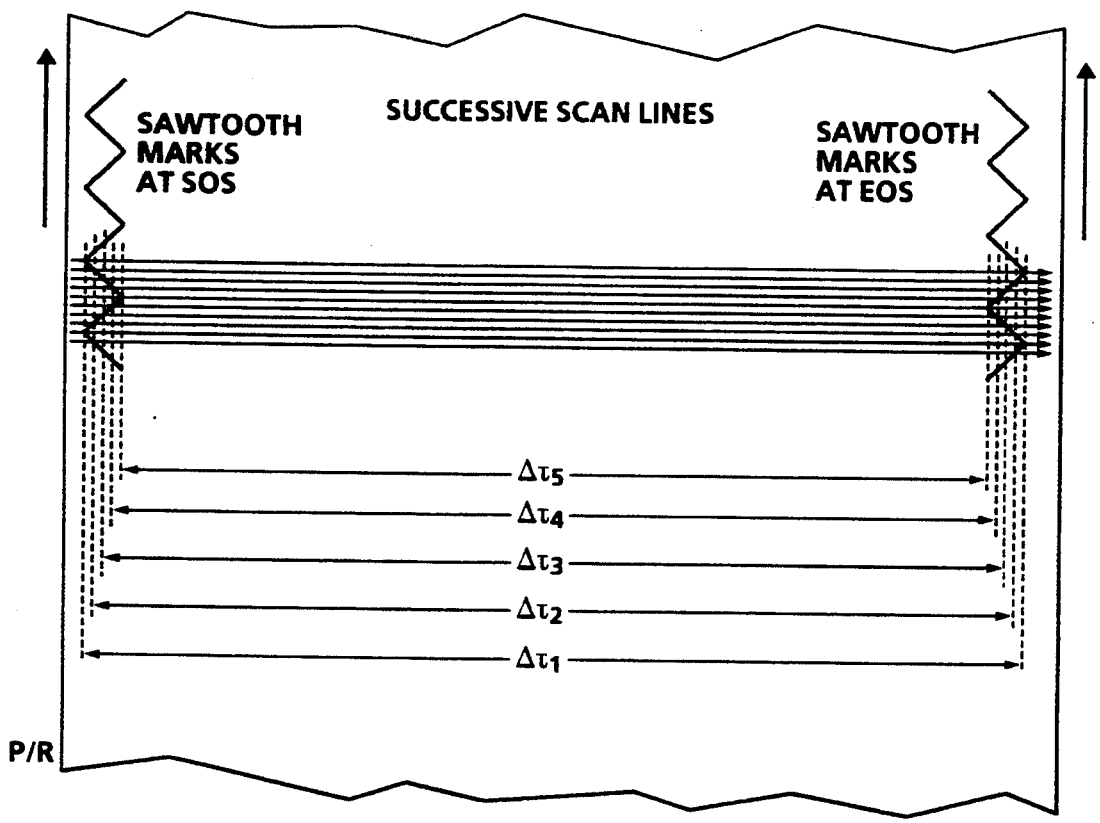
FIG. 4 is a timing diagram of the sawtooth signals.

The question arises as to which signals will determine the VCO adjustment, SOS-to-EOS, or SOS'-to-EOS'. The SOS-to-EOS signals are internal to the ROS and determine the speed of the scanning spot. If the scanning spot speed is not known, then the basic idea here is in jeopardy since the beam is supposed to be the probe which locates the PR. To resolve this problem, the procedure has to follow these steps:

1) From SOS and EOS of last few scans, determine the average speed of the spot at the P/R, $v_{scan}$.
2) From SOS' and EOS' of last scan, determine the distance $D_{reg}$ between the registration marks on the P/R per the just updated velocity $v_{scan}$: $D_{reg} = v_{scan} \times t_{sos'\,to\,eos'}$.
3) Compare $D_{reg}$ to nominal $D_{reg\,nom}$ and establish ratio $r = D_{reg}/D_{reg\,nom}$.
4) From the ROS synchronization electronics, given a $v_{scan}$ differential from nominal being detected, one expects a correction factor for the next scan. The ROS synchronization electronics will establish what the new clock speed f' should be, based on internal ROS information only, i.e. SOS-to-EOS signals. If the clock was left at that new speed, this would only compensate for the different scan speed. However, this would not compensate for the stretching, distortion and velocity variations of the PR. The warped PR actually needs a slight alteration of the nominal spot per inch (spi) resolution in order for the new exposure to be exactly registered to the first pass.
5) Therefore, the new clock speed has to be divided by r, as defined in 3) above, defining the "final clock speed", f''. If the PR had stretched, $r > 1$, the system would need a slower speed by that ratio.
6) Start the video stream as synchronized to the SOS' signal of that new-to-be scan line and expose at the new clock speed, f''. This synchronization to SOS' takes care of the lateral motion of the P/R.
7) For the longitudinal PR location probing, special marks are envisioned as a way to implement this. FIG. 4 shows an example of a sawtooth pattern being deposited in the side registration areas, wherein the succession of $\Delta\tau_1, \Delta\tau_2, \ldots$ can be used to locate the sawtooth. The ROS electronics perform a relative evaluation of SOS' to EOS' time delay from one scan to the next. Assuming that one sawtooth is made larger than the mechanical tolerance budget for the location of the PR, one can see that the point of the sawtooth can be located by the probe beam within that tolerance, hence locating the P/R longitudinal location. This could be done in the interdocument gap area prior to starting the actual active write. However, it could also be a monitoring function during active write. Note that once the active write is started, if the longitudinal motion of the PR varies or the PR has stretched, one cannot simply omit or add a scan line as that would constitute a sharp break in the sagittal direction. Therefore monitoring of this longitudinal variation during active write would be useful only if the differential can be fed back to drive an optical element in the ROS which would dither the beam sagittal location and/or spot size. This is another option.

II. Toner Transfer After Each Pass

In this case, the assumption is that the photoreceptor is entirely cleaned off after each pass such that the registration areas on the sides of the active write area would also be cleaned off. This would then remove the possibility of using the first pass to lay down the registration marks for use during the later passes as described earlier.

If there was an acceptable way (technically feasible, but at the expense of additional hardware) to protect those side areas from toner transfer to the paper and of P/R clean-off, and the first pass toner marks could be retained for the later passes even after recharge, then the whole description of I. would then still apply.

If this is not possible or at least not practical to do, permanent markings must be precisely placed on the photoreceptor at time of manufacture. These may be the sawtooth marks or just plain straight lines as discussed earlier. For this to bring any advantage, the first pass would again be deposited on the P/R based on the ROS SOS and EOS signals only. However, a record would be kept of the delays δt between the PR marks SOS' and EOS' signals and the SOS and EOS ROS internal signals.

On the next color pass, as the beam passes across the SOS' mark on the PR, the electronics would then know that the pixels for that line (or set of lines) occur δt after the PR mark. It will then duplicate the same delay before starting the next video stream. Similarly to the earlier discussion in I., the same algorithm is used to regulate the pixel clock.

It should be noted that an underlying assumption for all of these methods is that the deformations, misregistrations, and velocity variations of the PR are slower than the one line scan time, and therefore it can be considered that the computations could be started for one scan line at least 5 to 10 scan lines prior. The exact computation firmware or software times for such methods may relax or tighten the requirements.

For sagittal placement accuracy, the same feedback as earlier described would apply and would rely on some means of optically shifting scan lines internal to the ROS.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. In a xerographic color printer comprising a scanning laser beam which produces an output printed image and a border area from a first toner and subsequent toners which are laid down on a photoreceptor during first and subsequent passes, each pass comprising a plurality of scans, the method of registering said first and subsequent toners comprising the steps of:

A. on said first pass,
      charging said photoreceptor to a first voltage, charging said first toner to a second voltage which will enable said first toner to adhere to a charged portion of said photoreceptor, but not to a discharged portion, using said laser beam to discharge an area around two points in said border, but not discharge said two points themselves, the first point before the beginning of said image area, the second point after the end of said image area, and allowing toner to adhere to said two points to produce two toner marks, B. on each scan of said subsequent passes, using said laser beam to illuminate said marks, measuring said laser beam reflected from said photoreceptor to determine the locations of said marks, and computing from said locations of said marks the start and end points of said image area.

2. The method of claim 1 wherein said printer produces a plurality of scans in parallel and uses all of them to create said marks.

3. The method of claim 1 wherein said printer produces a plurality of scans in parallel and uses one of them to create said marks.

4. The method of claim 1 wherein said location of said mark is defined as the center of said mark.

5. The method of claim 1 wherein said location of said mark is defined as one edge of said mark.

6. In a xerographic color printer comprising a video image clock pulse generator and a scanning laser beam which produces an output printed page, comprising an image area having a predetermined length in the fast scan direction and a border area, from a first toner and subsequent toners which are laid down during first and subsequent passes, each pass comprising a plurality of scans, the method of registering said first and subsequent toners comprising the steps of:

A. on said first pass;

charging said photoreceptor to a first voltage, charging said first toner to a second voltage which will enable said first toner to adhere to a charged portion of said photoreceptor, but not to a discharged portion, using said beam on each scan to discharge the areas around two points in said border, but not discharge said two points themselves, the first point before the beginning of the image, the second point after the end of the image, and allowing toner to adhere to said charged portions to form two toner marks, B. for each scan of said subsequent passes, determining the average scan speed from a plurality of previous scan times, using said laser beam to illuminate said marks, detecting the laser light reflected from said marks to determine the location of said marks, and therefrom, determining the amount of time that elapsed between the detecting of the first and second points, computing the distance between said marks from said average scan speed and said time, and adjusting the frequency of the video clock pulses so that the video will create an image of said predetermined length.

7. In a xerographic color printer comprising a video image clock pulse generator and a scanning laser beam which produces an output printed page, comprising an image area having a predetermined length in the fast scan direction, a starting edge location and a border area, from a first toner and subsequent toners which are laid down during first and subsequent scans, each pass comprising a plurality of scans, the method of registering said first and subsequent toners comprising the steps of:

A. on said first pass, charging said photoreceptor to a first voltage, charging said first toner to a second voltage which will enable said first toner to adhere to a charged portion of said photoreceptor, but not to a discharged portion, using said beam on each scan to discharge the areas around two points in said border, but not discharge said two points themselves, the first point at a predetermined distance before the intended image area, the second point a predetermined distance after the intended image area, allowing toner to adhere to said charged points to form marks, and B. for each scan of said subsequent passes, determining the average scan speed from a plurality of previous scan times, using said laser beam to illuminate said marks, detecting the laser light reflected from said marks to determine the location of said marks, and therefrom, determining the amount of time that elapsed between the detecting of the first and second marks, computing the distance between said marks from said average scan speed and said time, using the computed distance to adjust the frequency of the video clock pulses so that the video will create an image of said predetermined size, and computing from said time between marks the amount of time that should elapse between the detection of the first mark and the start of the scanning of the image area.

8. The method of claim 7 wherein said marks in the process direction are arranged in a sawtooth pattern and wherein said computing step also computes the distance that the photoreceptor has moved in the process direction.

* * * * *